US010055575B2

(12) United States Patent
Adams et al.

(10) Patent No.: US 10,055,575 B2
(45) Date of Patent: Aug. 21, 2018

(54) SMART RANDOM PASSWORD GENERATION

(71) Applicant: BLACKBERRY LIMITED, Waterloo (CA)

(72) Inventors: Neil Patrick Adams, Waterloo (CA); Lukas Sydorowski, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 132 days.

(21) Appl. No.: 15/135,849

(22) Filed: Apr. 22, 2016

(65) Prior Publication Data

US 2017/0308695 A1    Oct. 26, 2017

(51) Int. Cl.
*G06F 21/46* (2013.01)
*H04W 12/04* (2009.01)
*H04L 29/06* (2006.01)

(52) U.S. Cl.
CPC ............ *G06F 21/46* (2013.01); *H04L 63/06* (2013.01); *H04L 63/0823* (2013.01); *H04W 12/04* (2013.01)

(58) Field of Classification Search
CPC .... G06F 21/46; H04W 12/04; H04L 63/0823; H04L 63/06
See application file for complete search history.

(56) References Cited

U.S. PATENT DOCUMENTS

| | | | | |
|---|---|---|---|---|
| 6,643,784 B1 * | 11/2003 | McCulligh | ............ | H04L 63/083 704/10 |
| 8,775,820 B1 * | 7/2014 | Freeburne | ............ | H04L 63/0838 713/184 |
| 9,722,868 B2 * | 8/2017 | Narasimhan | ........ | H04L 41/0806 |
| 2002/0078386 A1 * | 6/2002 | Bones | ............ | G06F 21/41 726/8 |
| 2005/0114673 A1 * | 5/2005 | Raikar | ............ | G06F 21/46 713/182 |
| 2007/0039042 A1 * | 2/2007 | Apelbaum | ............ | G06F 21/46 726/6 |
| 2009/0150677 A1 * | 6/2009 | Vedula | ............ | G06F 21/46 713/183 |

(Continued)

OTHER PUBLICATIONS

Fitzpatrick, Jason, "The How-To Geek Guide to Getting Started with LastPass", Nov. 2, 2016, 10 pages. (Year: 2016).*

(Continued)

*Primary Examiner* — Michael Pyzocha
(74) *Attorney, Agent, or Firm* — Rowand LLP

(57) ABSTRACT

A method for generating a password for accessing a password-protected service is disclosed. A password requirements database and default password generation requirements are stored in a memory of a computing device. The password requirements database includes one or more service profiles, where each service profile includes an identifier for a service and an associated indication of requirements of valid passwords for the service. If the password requirements database includes a service profile associated with the password-protected service, the password is randomly generated to comply with requirements of valid passwords indicated in the service profile associated with the password-protected service; otherwise, the password is randomly generated to comply with the default password generation requirements.

21 Claims, 5 Drawing Sheets

(56) References Cited

U.S. PATENT DOCUMENTS

| | | | | |
|---|---|---|---|---|
| 2013/0067545 A1* | 3/2013 | Hanes | H04L 9/3231 | 726/6 |
| 2013/0086658 A1* | 4/2013 | Kottahachchi | G06F 21/45 | 726/6 |
| 2013/0263250 A1* | 10/2013 | Leckey | H04L 63/0846 | 726/18 |
| 2014/0137220 A1* | 5/2014 | Niemela | G06F 21/31 | 726/6 |
| 2014/0289870 A1* | 9/2014 | Selander | G06F 21/46 | 726/28 |
| 2014/0298432 A1* | 10/2014 | Brown | H04L 63/083 | 726/6 |
| 2015/0244714 A1* | 8/2015 | Kundu | H04L 63/0846 | 726/6 |
| 2015/0286816 A1* | 10/2015 | Adler | G06F 21/45 | 726/6 |
| 2017/0011214 A1* | 1/2017 | Cavanagh | G06F 21/46 | |
| 2017/0104738 A1* | 4/2017 | Brown | H04L 63/062 | |
| 2017/0127104 A1* | 5/2017 | Thomas | H04N 21/2543 | |
| 2017/0132115 A1* | 5/2017 | Misra | G06F 11/3668 | |
| 2017/0169211 A1* | 6/2017 | Gao | G06F 21/46 | |
| 2017/0302648 A1* | 10/2017 | Ferrydiansyah | H04L 63/083 | |

OTHER PUBLICATIONS

Shay, Edward et al., "Encountering Stronger Password Requirements: User Attitudes and Behaviors", Symposium on Usable Privacy and Security (SOUPS) 2010, Jul. 14-16, 2010, Redmond, WA USA, 20 pages (Year: 2010).*

* cited by examiner

SMART RANDOM PASSWORD GENERATION

TECHNICAL FIELD

The present disclosure relates to system security and, in particular, to password generation and management on electronic devices.

BACKGROUND

Passwords are used for access control and authentication. Electronic devices, such as personal computers and mobile phones, may include software tools that facilitate management of passwords for users of the devices. A password manager on an electronic device can maintain records of user accounts and their associated passwords for various services that are accessible on the device. In some cases, the password manager may be configured to generate random password suggestions.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
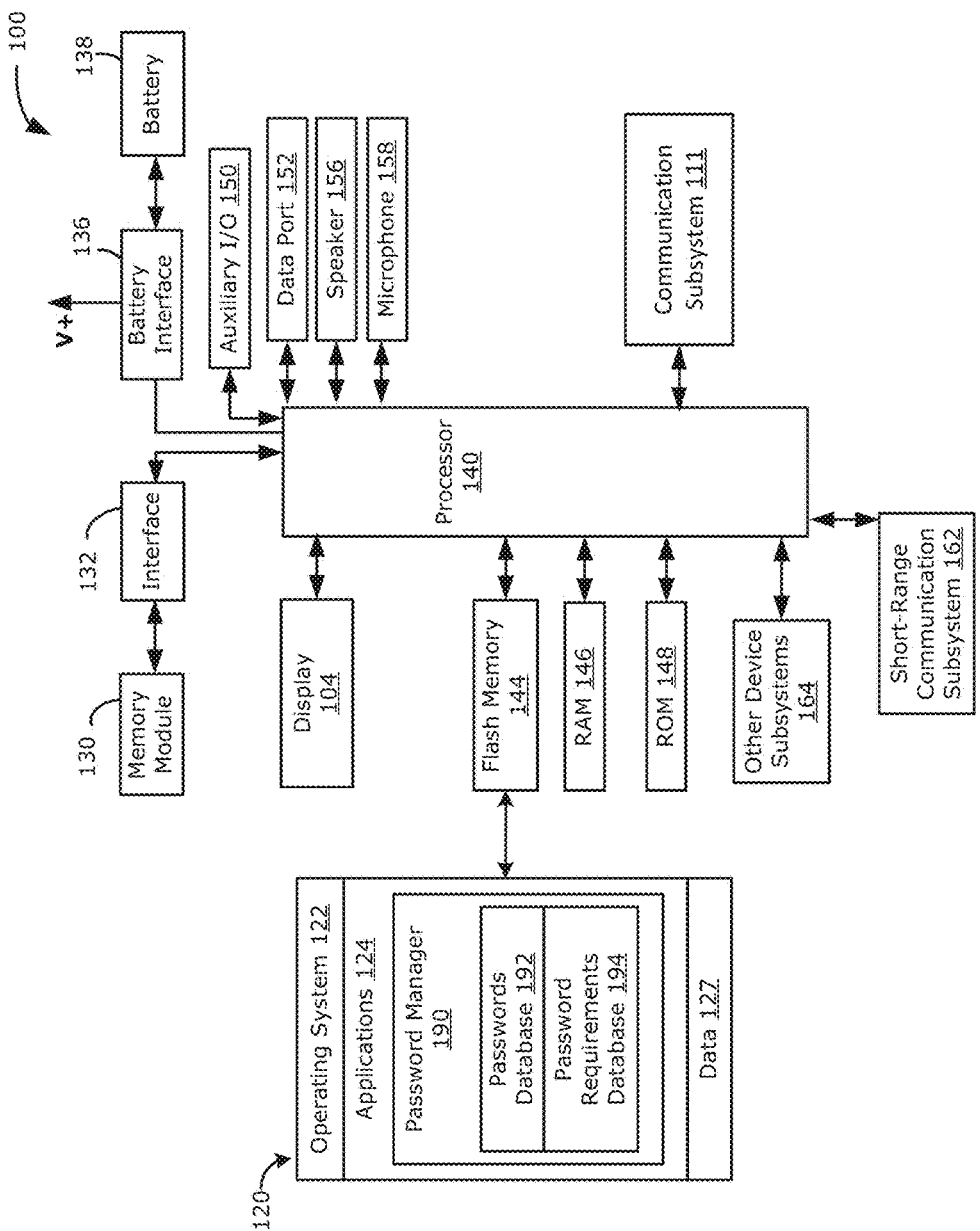
FIG. 1 is a block diagram illustrating components of an example electronic device.

In one aspect, the present disclosure describes a method for generating a password for accessing a password-protected service. The method includes storing information pertaining to one or more password requirements and one or more default password generation requirements, the information pertaining to one or more password requirements including one or more service profiles, each of the one or more service profiles including an identifier for a service and an associated indication of one or more requirements of a valid password for the service; receiving identifying information for the password-protected service; and if the one or more password requirements include a service profile associated with the identifying information, randomly generating the password to comply with the one or more password requirements indicated in the service profile associated with the identifying information, and if the one or more password requirements does not include a service profile associated with the identifying information, randomly generating the password to comply with the default password generation requirements.

In another aspect, the present disclosure describes an electronic device. The electronic device includes an input interface, a memory, and a processor coupled to the input interface and the memory. The electronic device also includes a password manager for generating a password for accessing a password-protected service. The password manager includes processor-executable instructions that, when executed, cause the processor to: store, in the memory, information pertaining to one or more password requirements and one or more default password generation requirements, the information pertaining to one or more password requirements including one or more service profiles, each of the one or more service profiles including an identifier for a service and an associated indication of one or more requirements of a valid password for the service; receive identifying information for the password-protected service; and if the one or more password requirements include a service profile associated with the identifying information, randomly generate a password that complies with the one or more password requirements indicated in the service profile associated with the identifying information, and if the one or more password requirements does not include a service provide associated with the identifying information, randomly generate a password that complies with the default password generation requirements.

Other example embodiments of the present disclosure will be apparent to those of ordinary skill in the art from a review of the following detailed descriptions in conjunction with the drawings.

In the present application, the term "password" is intended to broadly encompass any type of authenticator that may be used for authentication and/or to gain access or admission to a resource. A password may be text-based (e.g. wording or string of characters which may include alphabetical characters, numeric characters, special characters, other characters in any language, or any combinations thereof). The term "password" includes, without limitation, a passcode, passkey, PIN (personal identification number), passphrase (e.g., multiple words), and the like. A password may comprise speech. A password may be non-text-based (e.g. graphical, picture-based, motion-based, biometric). The term "password" includes, without limitation, symbols, icons, logos, ideograms, pictograms, emoji, emoticons, and the like. A password may be a combination of text-based and non-text-based data. It will be understood that a password may be generated by a user herself, generated by a third-party and distributed to a user, or automatically generated for a user by a computer system. By providing a correct combination of a user identifier and an associated password for a resource that requires authentication, a user may gain shared access (e.g. a limited-membership online forum) or private access (e.g. a personal banking account) to the resource.

In the present application, the term "password-protected service" is intended to encompass any service, system or resource for which authentication using one or more passwords may be required in order to gain access thereto. A password-protected service may comprise, among others, data networks, servers, computer systems, databases, web-based portals or services, payment services, and/or application accounts. In the context of an electronic device, a "password-protected service" may refer to a service, system, etc. which is implemented, at least in part, by elements that are external to the device. In particular, the device may be required to establish connections to the structural components (e.g. servers) that implement the password-protected service in order to communicate with the service. Upon providing acceptable authentication credentials, a user may access the password-protected service and data associated therewith. A "password-protected service" may also be a service that is locally implemented on an electronic device. Such services may include software (e.g. applications, utilities, etc.), databases, and documents which are loaded onto and/or executed on the electronic device. For example, a password may be required to access a user account on an application, to open a locked/protected document stored on the device, or to confirm identity as an administrator of the device in order to authenticate various actions, such as system updates, software installs, etc.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure provides a method for generating and managing passwords on electronic devices. Various software tools designed to facilitate management of passwords can be installed on user devices. For example, a web browser application on a desktop computer, laptop, or mobile communication device may include an integrated password management tool designed to remember passwords that are entered into a user interface of the web browser application. As a further example, an electronic device may include a stand-alone password manager application for storing account information for multiple different user accounts and the passwords associated with those accounts. Further examples of a password manager application include, without limitation, a wallet application, passbook application, travel application, shopping application, payment application, and/or other application that may store account information for multiple accounts, tickets for admission (e.g., concert tickets, movie tickets, sporting event or other event tickets, boarding passes, airline or other transportation tickets), payment cards (e.g., bank cards, credit cards, debit cards, gift certificates, gift cards), offers, discounts, coupons, membership cards, loyalty cards (e.g., points cards, frequent flyer cards, rewards cards), and the like. A common feature of password managers is the ability to generate random passwords for user accounts. When prompted to create a password, a user may select a simple, common and/or personally meaningful word or string of characters for use as a password and, as a consequence, a user-generated password can sometimes be relatively weak, i.e. easily guessable or prone to brute-force attacks. Automatic generation of a password using randomizing techniques can increase the complexity of the password and reduce the likelihood of embedding information specific to, or identifying, the user in the password.

In the case of text-based passwords, a random password consists of a string of symbols that are taken from a set of symbols (e.g. an ASCII character set) using a random selection process. Random passwords are often generated by taking input from a random or pseudorandom number generator and automatically generating a password. The strength of a random password may be represented by the information entropy of the random process that is used to produce the password. In particular, a strong password will generally have high entropy. Many systems and services that require authentication provide password policies to assist users in choosing strong passwords. A password policy may define a set of requirements which a generated password must satisfy before it may be accepted as a valid password. The requirements defined by a password policy may be influenced by such factors as level of theoretical security, compatibility with legacy systems, and usability. Furthermore, a password policy may evolve or be updated to effect changes to the set of requirements for valid passwords.

In one aspect, the present application describes methods of generating passwords which may ensure that the generated passwords automatically conform to requirements of various password policies. More specifically, the methods disclosed herein provide electronic devices the ability to generate random passwords that are valid for those services which require authentication and which enforce various restrictions on password selection.

Reference is first made to FIG. 1, which illustrates a block diagram of an example electronic device 100. In an example embodiment, the electronic device 100 may comprise a mobile communication device. In at least some example embodiments, the mobile communication device may comprise a two-way communication device having data and optionally voice communication capabilities, and the capability to communicate with other computer systems; for example, via the internet. As noted above, the electronic device 100 may take other forms in other embodiments.

The electronic device 100 of FIG. 1 includes a housing (not shown) which houses components of the electronic device 100. Internal components of the electronic device 100 may be constructed on a printed circuit board (PCB). The electronic device 100 includes a controller including at least one processor 140 (such as a microprocessor) which controls the overall operation of the electronic device 100. The processor 140 interacts with device subsystems such as a wireless communication subsystem 111 for exchanging radio frequency signals with a wireless network to perform communication functions. The processor 140 interacts with additional device subsystems including one or more input interfaces 106 (which may include, without limitation any of the following: a keyboard, one or more control buttons, one or more microphones 158, a gesture sensor 161, and/or a touch-sensitive overlay associated with a touchscreen display), flash memory 144, random access memory (RAM) 146, read only memory (ROM) 148, auxiliary input/output (I/O) subsystems 150, a data port 152 (which may be a serial data port, such as a Universal Serial Bus (USB) data port), one or more output interfaces (such as a display 104 (which may be a liquid crystal display (LCD)), one or more speakers 156, or other output interfaces), a short-range communication subsystem 162, and other device subsystems generally designated as 164.

The electronic device 100 may include a touchscreen display in some example embodiments. The touchscreen display may be constructed using a touch-sensitive input surface connected to an electronic controller. The touch-sensitive input surface overlays the display 104 and may be referred to as a touch-sensitive overlay. The touch-sensitive overlay and the electronic controller provide a touch-sensitive input interface and the processor 140 interacts with the touch-sensitive overlay via the electronic controller. That is, the touchscreen display acts as both an input interface and an output interface.

The electronic device 100 may communicate with any one of a plurality of fixed transceiver base stations of the wireless network within its geographic coverage area using the communication subsystem 111. The electronic device 100 may send and receive communication signals over the wireless network after the required network registration or activation procedures have been completed.

In some example embodiments, the auxiliary input/output (I/O) subsystems 150 may include an external communication link or interface, for example, an Ethernet connection. The communication subsystem 111 may include other wireless communication interfaces for communicating with other types of wireless networks; for example, Wi-Fi networks.

In some example embodiments, the electronic device 100 also includes a removable memory module 130 (typically including flash memory) and a memory module interface 132. Network access may be associated with a subscriber or user of the electronic device 100 via the memory module 130, which may be a Subscriber Identity Module (SIM) card for use in a GSM network or other type of memory module for use in the relevant wireless network type. The memory module 130 may be inserted in or connected to the memory module interface 132 of the electronic device 100.

The electronic device 100 may store data 127 in an erasable persistent memory, which in one example embodiment is the flash memory 144. In various example embodiments, the data 127 may include service data having information required by the electronic device 100 to establish and maintain communication with the wireless network. The data 127 may also include user application data such as messages (which may include without limitation any of the following: email messages, text messages, instant messages, multimedia messages, voice messages, and/or other messages), address book and contact information, calendar and schedule information, notepad documents, image files, and other commonly stored user information stored on the electronic device 100 by its user, and other data. In some embodiments of the present application, the data 127 includes one or more initial data limits 160 that set a threshold for the quantity of data to be downloaded from a messaging server for a new message.

The data 127 stored in the persistent memory (e.g. flash memory 144) of the electronic device 100 may be organized, at least partially, into a number of databases or data stores each containing data items of the same data type or associated with the same application. For example, email messages, contact records, and task items may be stored in individual databases within the electronic device 100 memory.

The electronic device 100 also includes a battery 138 as a power source, which is typically one or more rechargeable batteries that may be charged, for example, through charging circuitry coupled to a battery interface 136 such as the serial data port 152. The battery 138 provides electrical power to at least some of the electrical circuitry in the electronic device 100, and the battery interface 136 provides a mechanical and electrical connection for the battery 138. The battery interface 136 is coupled to a regulator (not shown) which provides power V+ to the circuitry of the electronic device 100.

The short-range communication subsystem 162 is an additional optional component which provides for communication between the electronic device 100 and different systems or devices, which need not necessarily be similar devices. For example, the short-range communication subsystem 162 may include an infrared device and associated circuits and components, a wireless bus protocol compliant communication mechanism such as a Bluetooth® communication module to provide for communication with similarly-enabled systems and devices, and/or a Near-Field Communication (NFC) interface.

A set of applications that control basic device operations, including data and possibly voice communication applications may be installed on the electronic device 100 during or after manufacture. Additional applications and/or upgrades to an operating system 122 or software applications 124 may also be loaded onto the electronic device 100 through the wireless network, the auxiliary I/O subsystem 150, the data port 152, the short-range communication subsystem 162, or other suitable device subsystems 164. The downloaded programs or code modules may be permanently installed; for example, written into the program memory (e.g. the flash memory 144), or written into and executed from the RAM 146 for execution by the processor 140 at runtime.

The processor 140 operates under stored program control and executes software modules 120 stored in memory such as persistent memory; for example, in the flash memory 144. As illustrated in FIG. 1, the software modules 120 may include operating system software 122 and one or more additional applications 124 or modules such as, for example, a password manager application 190. In the example embodiment of FIG. 1, the password manager application 190 is illustrated as being implemented as a stand-alone application 124, but in other example embodiments, the password manager application 190 may be implemented as part of the operating system 122 or another application 124.

The password manager application 190 stores one or more passwords. In particular, the password manager application 190 may implement a passwords database 192 that is configured to receive and store data corresponding to one or more passwords. The password manager application 190 may provide a functionality for adding passwords to the passwords database 192. A single password may be manually added to the passwords database 192 by a user of the electronic device 100, or a set of a plurality of passwords may be imported into the passwords database 192.

When a password is added to the passwords database 192, the password and its associated data may be saved in a password record. A password record may provide, without limitation, a title or name for the record, a user identifier (e.g. user name), the password associated with the user identifier, and identifying information for the service, resource, etc. for which the password is used. The identifying information for a service may include any one or more of: name (or title, label, etc.) of service, type of service, and a Uniform Resource Locator (URL) associated with the service (e.g. URL for the account login page of a web-based resource). A password record may include additional information, such as user account type, the date of creation of the password record, the date of most recent password update, a password expiry date, the next scheduled date for change of the password, password history for the service/account combination, and one or more current requirements for the password to be valid for use with the associated service.

A password record may be accessed via a user interface for the password manager application 190. For example, the graphical user interface for the password manager application 190 may display a listing of password records stored in the passwords database 192, and selection of an entry corresponding to a password record may display the data associated with the selected password record. The password manager application 190 may also provide an option to add a secret question to a password record for added security. The secret question may be selected from a list of predefined questions or added as a custom question, and stored in memory in association with a user-provided answer. The password manager application 190 would require the secret question to be answered correctly before access to the password record is granted. Other means of authentication may be used in addition to or instead of the secret question.

Access to the password manager application 190 and the data associated therewith may be controlled by a password. In particular, a master password may be required to gain access to the password manager application 190 and the records of the passwords database 192. The use of a master password obviates the need to remember multiple passwords in association with their respective user names and corresponding services. For example, the password manager application 190 may present a prompt to enter a user's master password each time a request to access the password manager application 190 is made. The features of the password manager application 190, including the password records for a specific user, become accessible when the user's master password is correctly input. A "master password" is a password as further described above and is intended to broadly encompass any type of authenticator that may be used for authentication and/or to gain access or admission to the password manager application. A master password may be text-based or non-text-based or both.

In some embodiments, the passwords database 192 may be stored locally in a memory (e.g. flash memory 144) of the electronic device 100. In particular, the password manager application 190 may directly access password records data for a user in the memory of the electronic device 100. Alternatively, the passwords database 192 may be stored at and maintained by a remote service. For example, a remote server associated with the password manager application 190 may be configured to maintain a plurality of password records for one or more users. The password manager application 190 can establish connections to the remote server in order to retrieve and/or update the password records stored remotely in the passwords database 192.

In at least some embodiments, the password manager application 190 may be configured to directly handle login procedures. That is, users may be able to log in to password-protected services, resources, etc. directly from the password manager application 190. When a password record is selected, the password manager application 190 may determine a suitable login application for accessing a login procedure for the service associated with the selected password record. Upon receiving an instruction to log in to the associated service using the credentials of the selected password record, the password manager application 190 may cause the login application to be launched. The steps of the login procedure for the service may then be completed automatically by using data from the selected password record. For example, a password record associated with a web-based email service, such as Outlook.com, may present an option to launch a web browser application to log in to an email account corresponding to the password record. When the web browser application is launched, the login page for the service may be displayed, with the logon fields automatically filled using the credentials of the password record. As a further example, a password record may be associated with a user account for a social media app (e.g. Facebook™) that is installed on the electronic device 100. The password manager application 190 may be configured to directly launch the social media app using the credentials of the password record such that the user account corresponding to the password record may be accessed.

Figure 2:
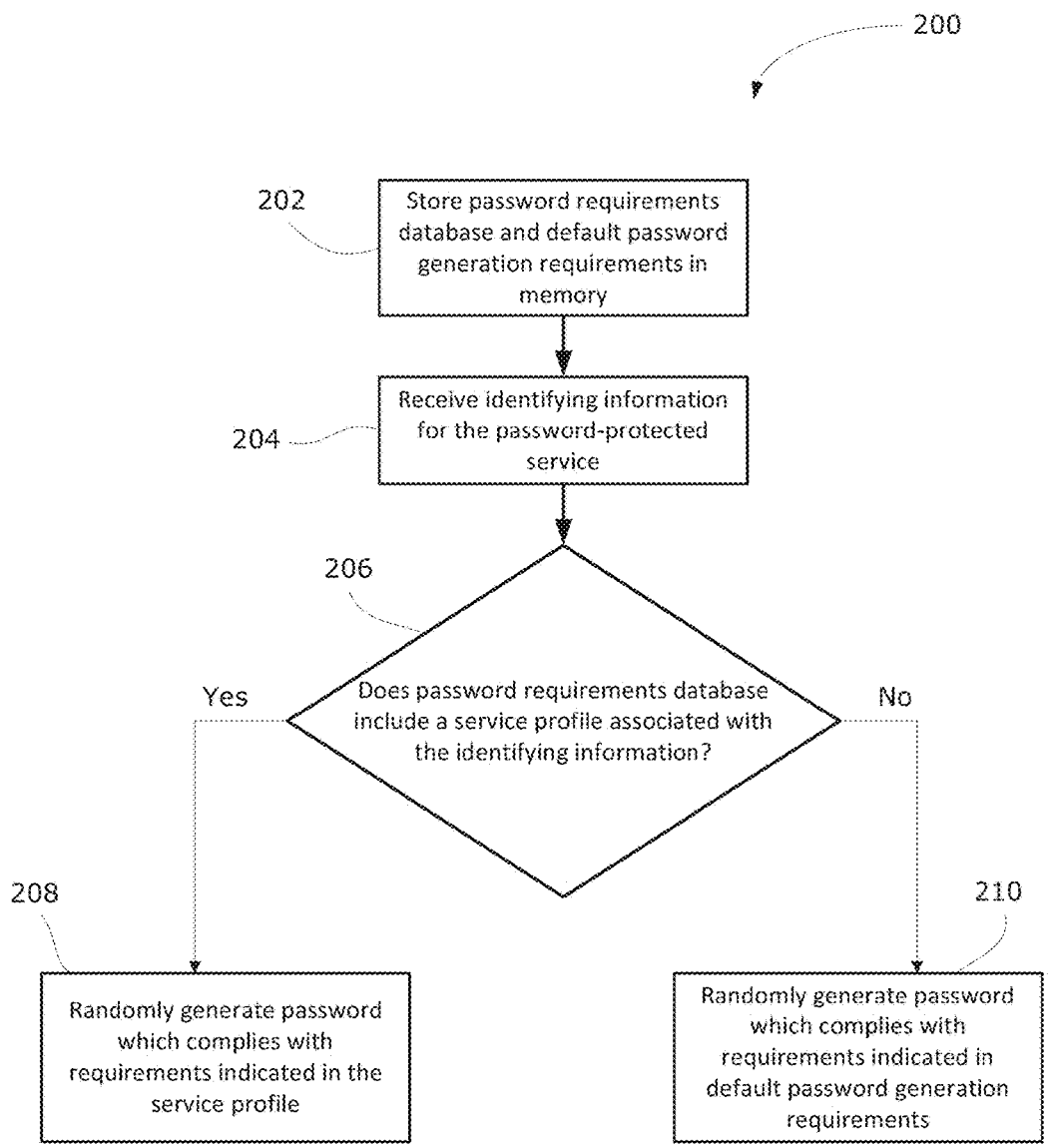
FIG. 2 shows, in flowchart form, an example method for generating a password in accordance with an example embodiment of the present disclosure.

Reference is now made to FIG. 2, which shows, in flowchart form, an example method 200 for generating a password on an electronic device. The method 200, in this example, may be implemented by a computing device, such as the electronic device 100 of FIG. 1. In particular, all or part of the method 200 may be implemented by password management software residing on the computing device, such as the password manager application 190 of FIG. 1.

The method 200 relates to generation of passwords for accessing password-protected services. In accordance with method 200, a plurality of passwords may be generated and/or maintained at a computing device, where each password is associated with a respective password-protected service, resource, etc. A password-protected service may be associated with a particular password policy which specifies the requirements that must be satisfied in order for a password to be considered valid for use with that service. For example, at the time of creating an account for a password-protected service, a user may be required to choose credentials, such as a user name and an associated password, which satisfy one or more explicitly defined rules relating to password length, requisite characters, etc.

In operation 202, a password requirements database is stored in a memory of the computing device. The password requirements database contains information relating to requirements of valid passwords for various password-protected services. In particular, the password requirements database includes one or more service profiles. A service profile defines a plurality of data fields to hold data relating to a password-protected service. Each service profile includes, at least, an identifier for a password-protected service (or resource, etc.) and an associated indication of the requirements of valid passwords for the password-protected service. The requirements of valid passwords for a service comprise one or more rules that indicate what type of password is permitted for use with that service. In particular, such requirements may include rules that relate to, without limitation, password length (e.g., a minimum length, a maximum length, or a specific length), presence of specific types of characters in passwords, case sensitivity, perceived password strength, prohibited elements in passwords, and password history of individual users. A service profile may include additional information, such as available account types for the password-protected service, password requirements for different account types, the date of most recent profile update, and a password expiration policy for the password-protected service.

The password requirements database may be stored in memory prior to or at the time of installing a password manager application on the computing device. For example, the computing device may be loaded with a database containing the password requirements for a select number of popular password-protected services. Alternatively, the password requirements database may be added to the memory after installation of a password manager application. In at least some embodiments, the password requirements database may be implemented as part of the password manager application. For example, the application data for a password manager application may include a password requirements database, which may be pre-populated with requirements data for one or more services or initialized as an empty database.

Default password generation requirements are also stored in the memory, in operation 202. The default password generation requirements define rules which apply to the generation of passwords for those services that do not have explicit password requirements. In other words, when a particular service does not define any restrictions on passwords that may be used for that service, the rules of the default password generation requirements serve to limit the passwords which may be generated for that service by the computing device. These rules may specify basic requirements of password length, character types, case sensitivity, etc. that promote use of strong passwords. In some embodiments, the default password generation requirements may be modified by a user of the computing device, for example, by adding or removing one or more password restrictions. Furthermore, the default password generation requirements may comprise multiple selectable sets of requirements. In particular, a user may be able to select a set of requirements which will apply to the generation of a password for a password-protected service that does not have defined password requirements.

In operation 204, identifying information for a password-protected service is received at the computing device. In at least some embodiments, the identifying information for a password-protected service may be directly received via an input interface of the computing device. For example, when creating a new password record or updating a previously-created password record in a password manager application, a user may enter the name of a service (e.g. Gmail) or a URL associated with the service (e.g. URL for the login page) into a graphical user interface (GUI) of the password manager application using an input interface, such as a keyboard or touchscreen display. As a further example, the identifier for a service (e.g. label, icon, etc.) may be selected from a drop-down menu provided in the GUI of the password manager application.

Other ways of receiving, at the computing device, information identifying a password-protected service are contemplated by the present disclosure. In some embodiments, the computing device may receive an inferred identity of a password-protected service based on contextual data collected at the computing device. For example, when a page that is currently displayed on a display of the computing device corresponds to a login or a password selection/reset page of an application (e.g. browser, mobile app, etc.), the computing device may be configured to detect the identity of the password-protected service based on contextual data (e.g. URL of website, identity of mobile app, etc.) associated with the service. The identifying information for the service may also be received at the computing device in response to one or more user input via input interfaces associated with the computing device. For example, when a user selects a fillable form field for a password or a user interface element for triggering password generation, contextual data identifying the password-protected service may be received by the computing device. The user interface element may, for example, comprise a button on a virtual keyboard associated with the computing device which may be displayed upon selection (e.g. long press, cursor placement, etc.) of a password form field. In some cases, a dedicated interface element, such as a button of a virtual keyboard, or a setting associated with an application may provide the option to generate a random password for a particular service.

Upon receipt of the identifying information for the password-protected service, the computing device determines whether the password requirements database includes a service profile associated with the identifying information, in operation 206. In particular, the password requirements database is queried to check if there are any service profiles that match the identifying information for the password-protected service. For example, the identifying information may be compared with data in any field of a service profile, including the identifier of the service, to determine whether there is a match.

If the password requirements database does contain a service profile associated with the identifying information for the password-protected service, in operation 208, a password for the password-protected service is randomly generated that complies with requirements of valid passwords as indicated in the service profile associated with the identifying information. In other words, if there is a match between the identifying information for the password-protected service and information in any of the identifier data fields of a service profile in the password requirements database, the password is generated using a randomizing technique and in such a manner as to respect the password constraints imposed by the password-protected service, as specified in the matching service profile.

Imposing constraints on a random password generation process may have the effect of reducing the number of possible passwords that may be formed. For example, requirements such as a maximum password length, inclusion of special characters, and prohibition of words in a password blacklist effectively reduce the set of possible passwords. There are various methods (e.g. employing pseudorandom number generator functions such as CryptGenRandom for Windows and /dev/random for the UNIX platform) for generating strong, cryptographically secure random passwords. Such methods can be customized to ensure that the resulting password complies with predefined password requirements.

If, on the other hand, the password requirements database does not contain a service profile associated with the identifying information for the password-protected service, in operation 210 a password for the password-protected service is randomly generated to comply with the default password generation requirements. In particular, if a profile for the service for which a password is generated cannot be found in the password requirements database, that password will be generated according to the rules specified by the default password generation requirements. In some embodiments, in response to determining that the password requirements database does not contain a service profile associated with the identifying information, a service profile for the password-protected service may be created based on the identifying information. The service profile can be initialized as an empty profile or populated, either manually by a user or automatically by the computing device, with requirements for valid passwords for the password-protected service. The newly-created service profile can then be stored in the password requirements database.

In at least some embodiments, a password-protected service may impose different sets of requirements for user accounts of different types. For example, a password-protected service may accommodate a plurality of different types of accounts, and each account type may have its own requirements for valid passwords. The method 200 may use account type information in order to generate valid passwords for password-protected services. In particular, a password for a user account at a password-protected service may be randomly generated such that the generated password complies with password requirements that are specific to the account type associated with the user account. For example, in operation 204, both the identifying information for a password-protected service and an indication of a type of user account may be received and, in operation 206, the password requirements database may be queried to determine whether it contains a service profile that is associated with the identifying information and which defines the requirements of valid passwords for the indicated user account type. If there is a match between the received information (i.e. identifier of password-protected service and user account type) and a service profile in the password requirements database, a password is randomly generated in accordance with the rules that are specific to the indicated user account type.

In operation 208 or 210, the password for the password-protected service may be generated based, at least in part, on user-defined criteria. That is, a user of the computing device may specify rules which are used to limit the random generation of a password. For example, a user may require numbers corresponding to her birth date be included in a random generated password. The user-defined criteria may serve as additional requirements which a password must satisfy in order to be accepted as a valid password. Additional restrictions on password generation may also be imposed by system administrators in implementing and maintaining various security policies.

While the method 200 is described herein primarily with respect to password generation, similar methods may be applicable for generating other elements of authentication credentials. For example, a service which requires user account setup may specify restrictions on the user name(s) that are permitted for the service. In a similar manner as operation 202, a computing device may maintain a user name requirements database which includes, at least, the requirements of valid user names for one or more services. More generally, a credentials requirements database containing user name and/or password requirements data may be stored in a computing device. The credentials requirements data may then be used to limit the random generation of authentication credentials such that the generated credentials comply with requirements imposed by their respective services.

In at least some embodiments, after a password for a password-protected service is randomly generated in operation 208 or 210, the computing device may transmit the generated password to the password-protected service in order to register the new password. In particular, a request to update a password currently registered with a password-protected service may be sent from the computing device, with the request including the newly-generated password. Alternatively, the user of the computing device may be presented with an option (e.g. on the GUI of the password manager application) to update the password with the password-protected service. For example, the user may be presented with a hyperlink to a webpage for changing a password for the password-protected service. Additionally, in some embodiments, a generated password may also be used to automatically populate a fillable form field for a website or application corresponding to the password-protected service. For example, if a password was randomly generated in response to user input requesting creation or change of password from a user interface (e.g. website, application page, etc.) associated with a particular service, the user interface may be automatically updated to include the generated password in an appropriate field.

It will be appreciated that, when a password is generated for a user account of a particular service, the password record in the passwords database that is associated with the service/account combination may be updated with the newly generated password. In particular, the generated password may be the first password for the password record or it may replace an existing password associated with the password record. For example, a password record for a service/account combination may be automatically updated when a password is randomly generated. Alternatively, a password record may be updated upon receiving confirmation from a user, via an input interface, to save the newly generated password in the password record.

Figure 3:
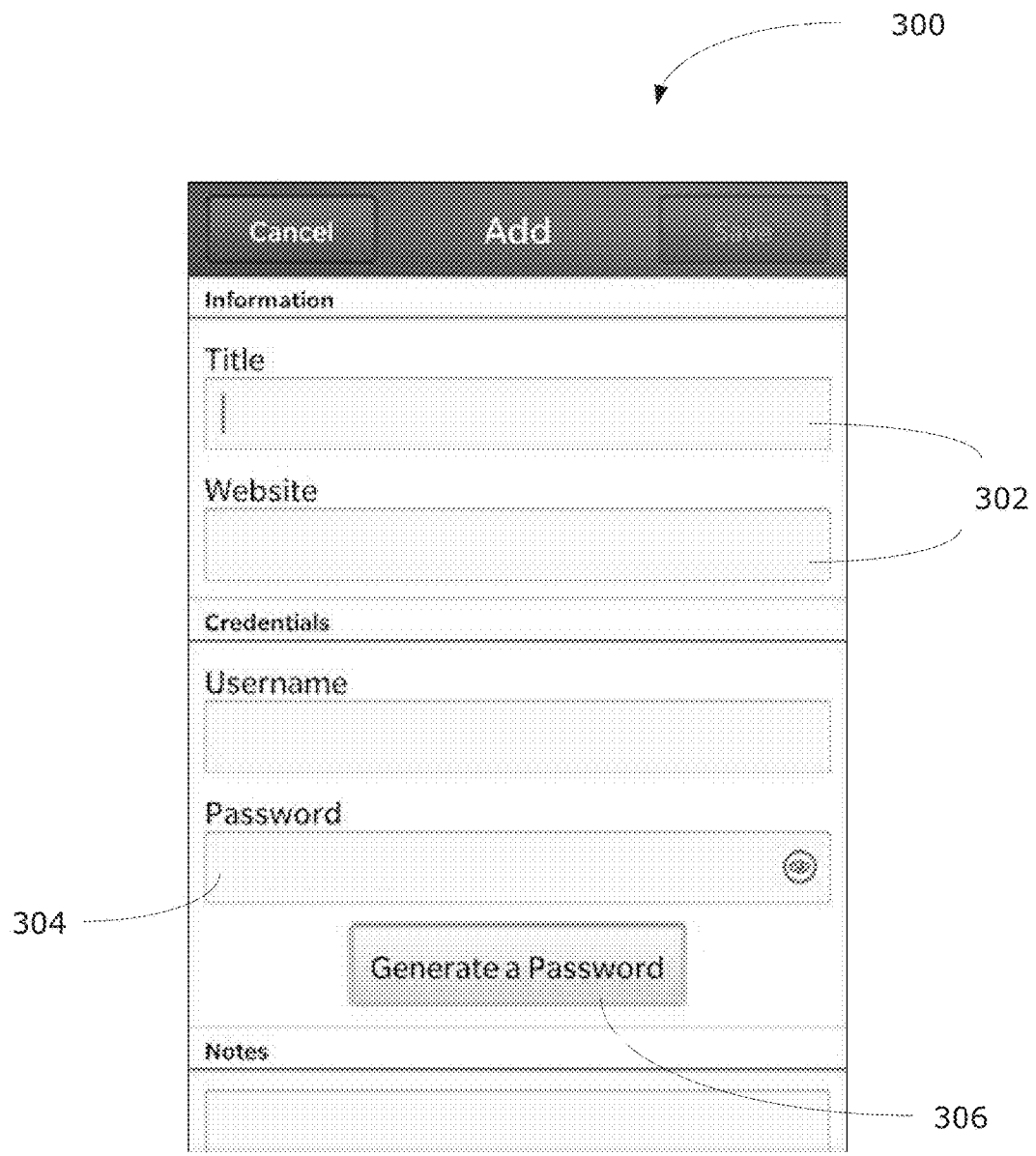
FIG. 3 illustrates an example application page for a password manager application in accordance with an example embodiment of the present disclosure.

An example password generation scenario will now be described with reference to FIG. 3. A password manager application on a mobile communication device may be used to manage a user's passwords for a plurality of different password-protected services. The password manager application can be accessed by entering the master password for an authorized user into a user interface of the password manager application. When the password manager application is launched, a list of existing password records may be displayed, as well as user interface elements corresponding to options to create new password records and to search a passwords database associated with the password manager application.

If the option to create a new password record is selected, an application page containing editable data fields may be displayed. FIG. 3 shows an example page 300 of the password manager application. In at least some embodiments, the application page 300 may be used to add a new password record to the passwords database. The application page 300 includes one or more data fields 302 to hold information identifying a password-protected service for which a password is maintained and a data field 304 to hold the password. The application page 300 also includes a user interface element 306 which may be selected in order to generate a password for the password record. In the example of FIG. 3, the user interface element 306 is a button which may be actuated to generate a random password. Once a user enters identifying information for a password-protected service in the data fields 302, a password may be randomly generated for the password-protected service by selecting the user interface element 306. In particular, a password may be generated in accordance with method 200 of FIG. 2 when the user interface element 306 is actuated by the user. The data field 304 may then be automatically populated with the generated random password.

Figure 4:
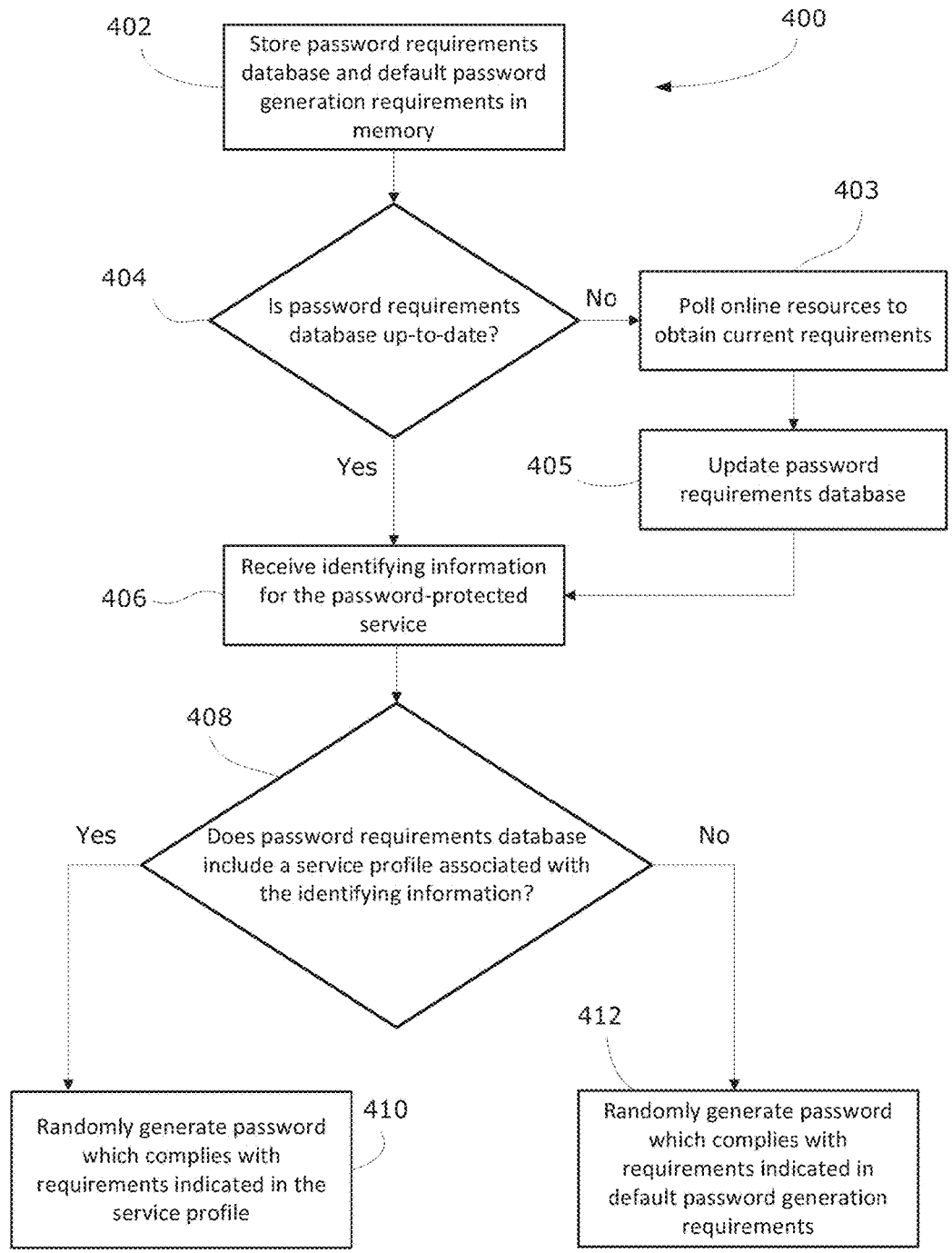
FIG. 4 shows, in flowchart form, a method for generating a password in accordance with another example embodiment of the present disclosure.

Reference is now made to FIG. 4, which shows, in flowchart form, another example method 400 for generating a password on an electronic device. The method 400, in this example, may be implemented by a computing device, such as the electronic device 100 of FIG. 1. In particular, all or part of the method 400 may be implemented by password management software residing on the computing device, such as the password manager application 190 of FIG. 1.

The requirements of valid passwords for various password-protected services may change over time. Such changes may be precipitated by a number of factors, including institutional changes in password policy, changes in the importance of a particular service/resource, increases in the number of total accounts at a service, and compatibility with system upgrades. As a result, existing passwords for these password-protected services need to be updated and any new passwords for the services must be generated as to comply with the most recent (i.e. current) password requirements. The method 400 facilitates dynamic updating of passwords in accordance with changes to password policies and requirements.

Operations 402, 406, 408, 410 and 412 correspond to operations 202, 204, 206, 208 and 210 of FIG. 2, respectively. In operation 404, the computing device performs a check to determine whether the password requirements database is up-to-date. In particular, the password requirements database is checked to ensure that the service profiles include the most recent requirements of valid passwords for their respective services. It should be noted that this check may be performed at any time after a password requirements database is stored in the memory of the computing device. For example, the computing device may check for the most recent password requirements for a profile associated with a password-protected service prior to generating a random password for that service, in operation 410. In some embodiments, a user may initiate the check from within a password manager application. Alternatively, the check may be performed automatically and/or periodically according to a schedule.

In performing the check of operation 404, the computing device may compare the data in the password requirements database with current password requirements information obtained from one or more remote resources. Alternatively, the computing device may determine whether the password requirements database is up-to-date based on the time elapsed since the most recent check or update of passwords. For example, if the elapsed time since the most recent check of requirements data exceeds a threshold duration, the password requirements database may be deemed to be out-of-date.

If it is determined that the password requirements database is not up-to-date, the computing device may poll one or more remote resources to obtain current requirements of valid passwords for the services associated with the services profiles in the password requirements database, in operation 403. The computing device makes requests to one or more of the remote resources to transmit password requirements data maintained by the remote resources. The remote resources may include servers, websites, online databases, etc. which may be capable of collecting and compiling current password requirements data, including password expiration policies, for a plurality of password-protected services. The remote resources may be configured to receive password requirements data directly from various online sources, to query services requiring authentication in order to obtain their password requirements data, and/or to permit manual updates by administrators.

In at least some embodiments, the one or more remote resources may be polled periodically or according to a schedule, without explicitly performing a check to determine whether the password requirements database is up-to-date. For example, for services which have frequently changing password requirements, the computing device may poll the remote resources at predefined time intervals. As a further example, a user of a computing device may trigger polling of the remote resources to obtain current requirements data, via the user interface of a password manager application on the computing device. The user interface may also be configured to allow the user to select the remote resources to poll and/or the services whose current password requirements should be retrieved.

After polling the remote resources, the computing device updates the password requirements database to indicate current requirements of valid passwords for the services associated with at least one of the service profiles in the password requirements database, in operation 405. In particular, the service profiles whose password requirements are not synchronized with the current password requirements of their respective services are updated. That is, if there are inconsistencies between information stored in the local password requirements database and the requirements data maintained at the remote resources, the inconsistencies may be resolved by replacing the set of requirements for a particular service with current password requirements data for the service, retrieved from the remote resources. In some embodiments, the password records of the passwords database may also be revised to reflect the current requirements for the respective passwords.

The computing device may also be configured to alert users regarding expiration of passwords for various services. In at least some embodiments, the computing device may check the password expiration policies associated with one or more service profiles in the password requirements database to determine whether a password in the passwords database has expired or is close to expiring. For example, the identifying information for a password-protected service may be used to query the password requirements database to retrieve the password expiration policy for the service, and the device may compare or compute the expiry date for the password for that service. The computing device is configured to then present a notification regarding the expiry of the password. For example, if the password for the service has already expired (or if the expiry date for the password is within a threshold period of time from the current time), the computing device may present a notification indicating that the password has expired (or that the password will expire within a certain amount of time).

Figure 5:
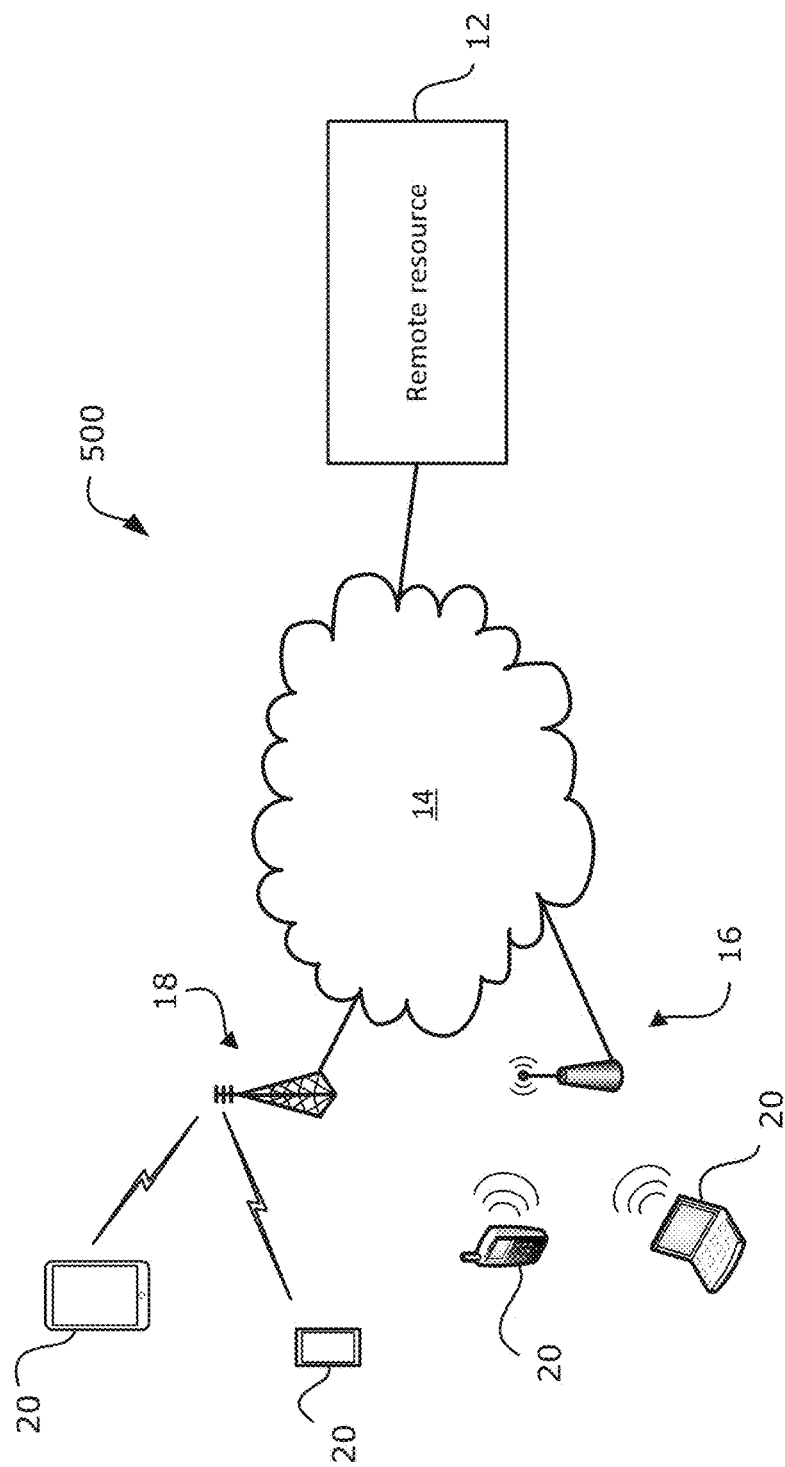
FIG. 5 is a schematic diagram illustrating components of an example password management system.

Reference is now made to FIG. 5, which shows one example embodiment of a password management system 500. The password management system 500 includes a remote resource 12, such as a server, web-based database, etc., and one or more electronic devices 20. The electronic devices 20 may include vehicles, mobile devices, smartphones, smartwatches or other accessories, computers, tablets, laptops, or any other electronic device configured for connection over wireless networks. The electronic devices 20 are configured to connect to the remote resource 12 using a data connection established via one or more networks, including one or more wireless networks. The wireless networks may include a cellular network 18. The cellular network 18 implements one or more protocols for data communications with electronic devices 20 connected to the network 18 such as, for example, HSPA+, LTE, UMTS, or other protocols for data communication. The wireless networks may include wireless local area networks (WLANs) 16 such as, for example, Wi-Fi networks, WiMAX networks, or the like. The data communication between the electronic devices 20 and the remote resource 12 traverses one or more data networks 14, such as the Internet. It will be appreciated that the data connection between the remote resource 12 and the electronic device 20 may include a number of intermediate devices, including proxy servers, relays, routers, switches, and other network equipment.

The electronic devices 20 are configured with password management software that can retrieve data directly from the remote resource 12. The remote resource 12 maintains current password requirements data for one or more services that require authentication for access. In some embodiments, the electronic device 20 polls or queries the remote resource 12 for password requirements data, perhaps periodically. In response, the remote resource 12 sends current password requirements data or other relevant information (e.g. time of last update of data maintained by the remote resource, list of services newly added to the remote resource and their associated password requirements, etc.).

In at least some embodiments, the remote resource 12 may be an access-controlled resource. More specifically, the remote resource 12 may require electronic devices 20 to authenticate themselves in order to gain access to the current password requirements data maintained by the remote resource 12. Electronic devices 20 may need to obtain permission to access the remote resource 12 from, for example, a third-party entity or an administrator of the remote resource 12. For example, the electronic devices 20 may request to receive credentials, from an authenticating entity, for accessing the remote resource 12 and use those credentials in order to establish connections to the remote resource 12.

Further, to ensure the authenticity and integrity of the password requirements data provided by a remote resource, the computing device may establish secure connections by verifying one or more digital certificates associated with the remote resource. In particular, the password manager application of the computing device may check for a valid digital signature associated with password requirements data from the remote resource prior to retrieving to the computing device.

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for generating a password, the method comprising:
    storing information pertaining to one or more password requirements and one or more default password generation requirements, the information pertaining to one or more password requirements including one or more service profiles, each of the one or more service profiles including an identifier for a service and an associated indication of one or more requirements of a valid password for the service;
    determining an identity of a password-protected first service based on contextual data associated with the first service that is received at a computing device;
    in response to determining that the one or more password requirements include a service profile associated with the first service:
        determining whether the one or more password requirements indicated in the service profile associated with the first service are up-to-date;
        in response to determining that the one or more password requirements are not up-to-date, sending a request to a remote resource associated with the first service to transmit current password requirements for the first service to the computing device; and
        randomly generating, by a processor of the computing device, a password to comply with the current password requirements for the first service as received from the remote resource.

2. The method of claim 1, further comprising, if the one or more password requirements does not include a service profile associated with the first service:
    generating a new service profile for the password-protected service based on the identifying information; and
    storing the generated new service profile as part of the information pertaining to one or more password requirements.

3. The method of claim 2, further comprising:
    polling one or more remote resources to obtain current requirements of valid passwords for services associated with at least one of the service profiles; and
    updating the information pertaining to one or more password requirements to indicate the current requirements of valid passwords for the services associated with the at least one of the service profiles.

4. The method of claim 3, wherein the one or more remote resources are polled periodically.

5. The method of claim 3, further comprising, prior to polling the one or more remote resources, establishing secure connections to the one or more remote resources by verifying digital certificates associated with the one or more remote resources.

6. The method of claim 1, wherein requirements of valid passwords for a service comprise one or more rules relating to at least one of:
    password length;
    presence of specific types of characters in a password;
    perceived password strength;
    prohibited elements in a password; or
    user password history.

7. The method of claim 1, wherein randomly generating the password comprises generating the password based, at least in part, on user-defined criteria.

8. The method of claim 1, further comprising transmitting the generated password to the password-protected service to register the generated password.

9. The method of claim 1, further comprising receiving an input instruction via a user interface to generate the password and wherein generating the password is performed in response to receiving the input instruction.

10. An electronic device, comprising:
    an input interface;
    a memory;
    a processor coupled to the input interface and the memory; and
    a password manager for generating a password, the password manager including processor-executable instructions that, when executed, cause the processor to:
        store, information pertaining to one or more password requirements and one or more default password generation requirements, the information pertaining to one or more password requirements including one or more service profiles, each of the one or more service profiles including an identifier for a service and an associated indication of one or more requirements of a valid password for the service;
        determine an identity of a password-protected service first service based on contextual data associated with the first service that is received at an electronic device;
        if the one or more password requirements include a service profile associated with the first service:
            determine whether the one or more password requirements indicated in the service profile associated with the first service are up-to-date;
            in response to determining that the one or more password requirements are not up-to-date, sending a request to a remote resource associated with the first service to transmit current password requirements for the first service to the electronic device;
randomly generate a password that complies with the current password requirements for the first service as received from the remote resource; and
if the one or more current password requirements does not include a service profile associated with the first service, randomly generate a password that complies with the default password generation requirements.

11. The electronic device of claim 10, wherein the instructions, when executed, further cause the processor to, if the one or more password requirements does not include a service profile associated with the first service:
generate a new service profile for the password-protected service based on the identifying information; and
store the generated new service profile in the memory.

12. The electronic device of claim 11, wherein the instructions, when executed, further cause the processor to:
poll one or more remote resources to obtain current requirements of valid passwords for services associated with at least one of the service profiles; and
update the memory to indicate the current requirements of valid passwords for the services associated with the at least one of the service profiles.

13. The electronic device of claim 12, wherein the one or more remote resources are polled periodically.

14. The electronic device of claim 12, wherein the instructions, when executed, further cause the processor to, prior to polling the one or more remote resources, establish secure connections to the one or more remote resources by verifying digital certificates associated with the one or more remote resources.

15. The electronic device of claim 10, wherein requirements of valid passwords for a service comprise one or more rules relating to at least one of:
password length;
presence of specific types of characters in a password;
perceived password strength;
prohibited elements in a password; or
user password history.

16. The electronic device of claim 10, wherein randomly generating the password comprises generating the password based, at least in part, on user-defined criteria.

17. The electronic device of claim 10, wherein the instructions, when executed, further cause the processor to transmit the generated password to the password-protected service to register the generated password.

18. The electronic device of claim 10, wherein the instructions, when executed, further cause the processor to receive, via the input interface, user instruction to generate the password and wherein the determining step is performed in response to receiving the user instruction.

19. The electronic device of claim 10, wherein each service profile includes a password expiration policy for a respective service and wherein the instructions, when executed, further cause the processor to, if the one or more password requirements include a service profile associated with the identifying information, determine that a current password, stored in the memory, for accessing the password-protected service has expired based on a password expiration policy in the service profile associated with the identifying information.

20. The electronic device of claim 19, wherein the instructions, when executed, further cause the processor to present a notification on the electronic device indicating that the current password has expired.

21. A non-transitory computer-readable medium storing processor-executable instructions for generating a password, wherein the instructions, when executed, cause an electronic device to:
store information pertaining to one or more password requirements and default password generation requirements, the information pertaining to one or more password requirements including one or more service profiles, each of the one or more service profiles including an identifier for a service and an associated indication of one or more requirements of a valid password for the service;
determine an identity of a password-protected first service based on contextual data associated with the first service that is received at a computing device;
if the one or more password requirements include a service profile associated with the first service:
determine whether the one or more password requirements indicated in the service profile associated with the first service are up-to-date;
in response to determining that the one or more password requirements are not up-to-date, sending a request to a remote resource associated with the first service to transmit current password requirements for the first service to the electronic device;
randomly generate a password to comply with the current password requirements for the first service as received from the remote resource; and
if the one or more current password requirements does not include a service profile associated with the first service, randomly generate a password to comply with the default password generation requirements.

* * * * *